United States Patent [19]

Saxman et al.

[11] Patent Number: 4,509,607
[45] Date of Patent: Apr. 9, 1985

[54] COMPRESSIBLE PRESSURE COMPENSATOR WITHIN CLOSED LUBRICANT VOLUME OF AN EARTH BORING APPARATUS

[75] Inventors: William C. Saxman, Irving; Larry J. Parker, Fort Worth, both of Tex.

[73] Assignee: Dresser Industries, Inc., Dallas, Tex.

[21] Appl. No.: 527,704

[22] Filed: Aug. 26, 1983

[51] Int. Cl.³ ............................................. E21B 10/24
[52] U.S. Cl. .................................... 175/227; 175/371; 384/93; 384/94
[58] Field of Search .............. 175/227, 228, 371, 372; 308/187; 384/93; 184/103 R, 14

[56] References Cited

U.S. PATENT DOCUMENTS

| | | | |
|---|---|---|---|
| 1,532,178 | 4/1925 | Godbold | 175/228 |
| 2,187,037 | 1/1940 | Kirkpatrick | 255/71 |
| 2,611,668 | 9/1952 | Douglass | 308/187 |
| 3,419,093 | 12/1968 | Lichte et al. | 175/228 |
| 3,844,364 | 10/1974 | Crow | 175/228 |
| 3,866,716 | 2/1975 | Matson | 184/14 |
| 4,182,425 | 1/1980 | Garrett | 175/228 |
| 4,261,426 | 4/1981 | Garrett | 175/228 |
| 4,287,957 | 9/1981 | Evans | 175/17 |
| 4,335,791 | 6/1982 | Evans | 175/228 |

FOREIGN PATENT DOCUMENTS

| | | | |
|---|---|---|---|
| 0326347 | 3/1972 | U.S.S.R. | 175/228 |
| 0442283 | 9/1975 | U.S.S.R. | 175/228 |

Primary Examiner—Stephen J. Novosad
Assistant Examiner—Hoang C. Dang
Attorney, Agent, or Firm—Fred A. Winans

[57] ABSTRACT

A compressible pressure compensating member is disposed within a sealed lubricant volume enclosing a bearing and seal system of an earth boring apparatus. Lubricant is maintained within the volume by metal face seals so that both the bearing and the seal structure are lubricated thereby. As the lubricant expands, due to thermal expansion under use, the increased pressure is accommodated by compression of the compressible member so that no lubricant is expelled through the seals. When the lubricant cools and contracts, the compensator expands to maintain the lubricant volume at the initially filled level.

4 Claims, 3 Drawing Figures

COMPRESSIBLE PRESSURE COMPENSATOR WITHIN CLOSED LUBRICANT VOLUME OF AN EARTH BORING APPARATUS

BACKGROUND OF THE INVENTION

1. Field of the Invention

This invention relates generally to an earth boring apparatus having sealed lubricant reservoirs enclosing the bearing and seal systems thereof and, more particularly, to means for compensating for internal pressure built up within the lubricant reservoir due to thermal expansion of the lubricant.

2. Brief Description of the Prior Art

In rotatable earth boring apparatus it is common to mount an earth contacting member such as a cutter or a stabilizing roller, on an axle member with bearing means, whether friction or anti-friction disposed therebetween. The working conditions of such apparatus generally are very severe in that the external surrounding enviroment is air-laden with abrasive particles of rock and dust. Thus, it is quite common to seal the bearings from the external environment and, within the sealed bearing environment, provide a lubricant. As is typical in many applications, the seals must also be lubricated to maintain an effective sealing relationship for the effective life of the tool. As these seals are normally located at opposed ends of the axis of the rotating members, and as these rotating members are also quite often disposed on an axis which is vertical or at some rather large angle (i.e. 30° or more) with respect to the horizontal, at least one of these seals tends to be at the greatest elevation of the lubricant reservoir. For such uppermost seal to remain lubricated it is essential to maintain the lubricant reservoir substantially full.

During operation of the earth boring apparatus, the lubricant expands due to its increase in temperature under working conditions, at which time, if the reservoir starts at a condition which is substantially full, expands to a volume to completely fill it and any expansion beyond that causes an internal pressure which is sufficient to breach the seal and expel the lubricant. Upon cooling or when subsequently operating in a less heated condition, contraction of the lubricant will then result in the volume being less than initially filled which likely results in such seal not being fully lubricated, thereby causing deleterious wear thereto. Also, if sufficient oil is expelled from this reservoir, it is not uncommon for the uppermost bearing to also be depleted of oil at least during a portion of its rotation, again with deleterious effects on the life of the bearing.

It is apparent that relieving the pressure with a pressure compensating device that bleeds off the portion of the lubricant during high internal pressure would have the same end result of expelling lubricant from the cavity. U.S. Pat. No. 2,187,037 to L. H. Kirkpatrick shows rotating earth contacting apparatus having a lubricant volume sealed on each end by sealing members which themselves are axially moveable so that if the external pressure is greater than the internal lubricant reservoir pressure, the seals are moved axially into a tighter sealing engagement until such pressures are generally equalized or, in the alternative, if the internal pressure is greater, the end seals are moved outwardly to accommodate this pressure and again tend to equalize internal and external pressure across the seals.

BRIEF DESCRIPTION OF THE INVENTION

The present invention defines a resilient compressible member disposed completely within a sealed lubricant volume of an earth boring apparatus. The member is generally impervious to the lubricant and compressible, in response to increased pressure in this volume due to thermal expansion of the lubricant, to prevent the pressure from exceeding the internal pressure limit of the seals. Thus, as the thermal expansion of the lubricant continues, the compression of the compensating member continues to accommodate the increased lubricant volume so that no lubricant is lost through the seals. Upon the lubricant becoming cooled and contracting in volume, the compensator expands in a like amount so that all times the lubricant volume is maintained substantially filled, and the bearings and seals are effectively lubricated throughout their rotating level.

DESCRIPTION OF THE PREFERRED EMBODIMENT

Figure 1:
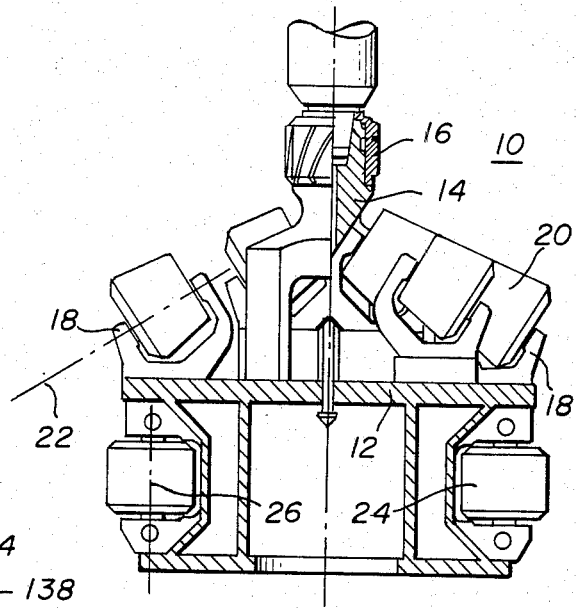
FIG. 1 is an elevational view, with a portion in cross-section, of an earth boring tool, namely a boxhole head, with integral stabilizer means and illustrating earth engaging rotating apparatus having both vertical and slanted axis.

Referring now to FIG. 1, a box hole head 10 is therein shown which includes a main body portion 12 having an axially extending centrally located stem 14 terminating in its uppermost end in a grade portion 16 which engages the pilot hole as the boxhead is pulled upwardly by a drill string threaded into the box end of the stem. The body 12 supports a plurality of saddle members 18, each of which in turn rotatably supports a cutter member 20. It should be noted that each cutter member 20 is supported in the saddle member for rotation about an axis generally disposed at an angle approximately 30° with respect to horizontal. As the box hole head is rotated about its central axis, the earth engaging and disintegrating structure such as teeth or inserts (not shown) disposed about the external surface of the cutter members 20 contact the earth and cause the cutter members to rotate about their axis 22 whereby the pilot bore, as the box hole head is raised by the drill string, is enlarged to the diameter of the largest path of the earth contacting elements.

The box hole head is stabilized within the enlarged hole by a plurality of stabilizer rollers 24 supported on the head 12 and rotatably mounted on a vertical axis 26 so that earth engaging structure (not shown) on the body of the roller engage the outer diameter of the enlarged hole to stabilize the rotation of the box hole head. It is apparent that the box hole head 12 just described operates generally in a rather embrasive-laden environment causing the rotating cutters and the rotating stabilizer rollers to be exposed to grit and dirt from the surrounding air.

Figure 2:
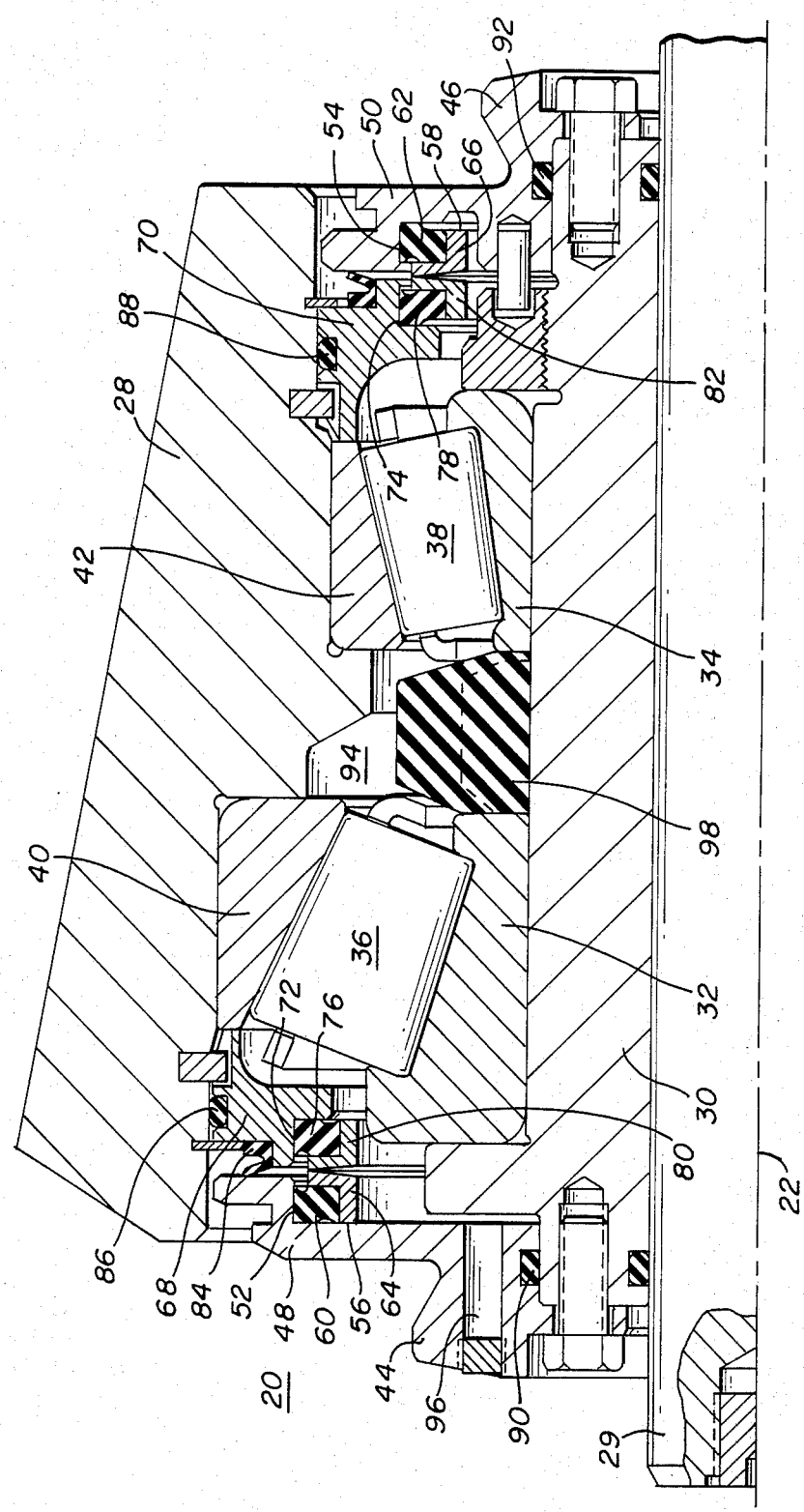
FIG. 2 is a cross-sectional portion through the axis of the rolling cutter of FIG. 1 showing the lubricant volume and compensator in accordance with the present invention.

Referring now to FIG. 2, the internal cavity of roller cutter 20 of FIG. 1 is shown. As therein seen, cutter 20 includes an outer frusto-conical shell or body 28 which has mounted on the surface thereof cutter structure such as teeth or inserts (not shown) which engage and disintegrate the earth. Body 28 is mounted for rotation about an axle member or pin 29 which, as previously indicated is mounted within a saddle member 18 such that the axis 22 is disposed at an angle of approximately 30°. The cutter includes an internal stationary hub member 30 engaging the axle and defining on its periphery a seating surface for the internal races 32, 34 of axially spaced roller bearing means 36, 38. The internal periphery of cutter body 28 likewise defines a seating surface for locating the opposed outer bearing races 40, 42 for engagement with roller bearings 36, 38, respectively.

As viewed in FIG. 2, a left hand end plate 44 and a right hand end plate 46 are attached to the hub 30 at the distal ends thereof and each defines a radially extending web portion 48, 50 having a contoured internal surface providing a shoulder 52, 54 into which is bonded or secured an annular seal member 56. 58.

Annular seal members 56, 58 each provide the stationary member of a pair of annular sealing means, with such seal member comprising an annular rubber portion 60, 62 seated in the shoulders 52, 54, respectively, and providing the energizing force for an annular metal surface 64, 66.

Disposed on the inner surface of body 28 are a pair of sealing ring mounting collars 68, 70 with each disposed interiorly of and adjacent to the end plates 44, 46 and keyed for rotation with the body 28. Each collar 68, 70 defines a shoulder 72, 74 for receiving a rotating seal ring 76, 78 in mating opposed sealing engagement with seal rings 56, 58. Seal rings 76, 78 are essentially mirror images of their opposing seal rings and provide a metal ring 80, 82 in energized sealing engagement with metal ring 64, 66, respectively. In addition, collars 68, 70 support annular dust exclusion seals 84, 86 which engage an internal face of the end plates, respectively, for protecting the metal sealing faces 64, 80, and 66, 82 of the primary seals. Other seals such as O-rings 86, 88, 90 and 92 and squeezed within grooves between mating surfaces to, in conjunction with the primary seals, provide a substantially sealed volume 94 provided between the rotating body 28 and the hub 30 within which is disposed the bearing members 36, 38. It is also noted that the engaging metal faces of the primary seals are also opened to this volume 94.

Volume 94 is filled, through a plugged aperture 96 in the left end plate 44, with an appropriate lubricant. It has been found that for long life operation of the bearings and the primary metal face seals, that it is necessary to maintain volume 94 substantially completely full of lubricant so that, at all times, the lubricant surrounds the bearings and is immediately adjacent the sealing interface throughout the annular extent thereof of the primary seals. To accomplish this, the volume 94, is upon assembly of the cutter 28, initially completely filled with lubricant. However, as previously explained, during normal use of the cutter, the lubricant will become heated and, due to thermal expansion, cause an increase in pressure sufficient to breach the primary seals and become expelled from the volume. Thereafter, upon cooling, the volume would be less than completely filled. To accommodate this phenomenon, and in accordance with the present invention, an annular closed cell elastomer (with the cells being gas filled) pressure compensator 98 is disposed within volume 94 in the axial space separating the roller bearing means 36, 38.

Compensator 98 is formed of an elastomer which is compatible and non-pervious to the lubricant within the volume and is compressible to a lesser volume at a pressure which is less than the pressure which causes the lubricant to leak past the primary seals. Therefore, at initial assembly, the volume 94 is completely filled with lubricant and as the lubricant becomes heated and expands during use, the internal pressure caused thereby compresses the elastomer compensator 98 (such as shown in phontom) rather than leaking past the primary seals 64, 80 and 66, 82. Thereafter, as the lubricant cools and contracts, the internal pressure decreases and the elastomer accordingly expands to maintain the volume 94 is initially filled with lubricant.

It will be appreciated that with the axis of the cutter members 20 disposed at the 30° incline as shown in FIG. 1 the most elevated portion of the lubricant reservoir 94 will be adjacent the right-hand primary seals 66, 82 and with any lubricant lost from the volume, this metal-to-metal face seal would not be lubricated at least at the upper portion thereof.

Figure 3:
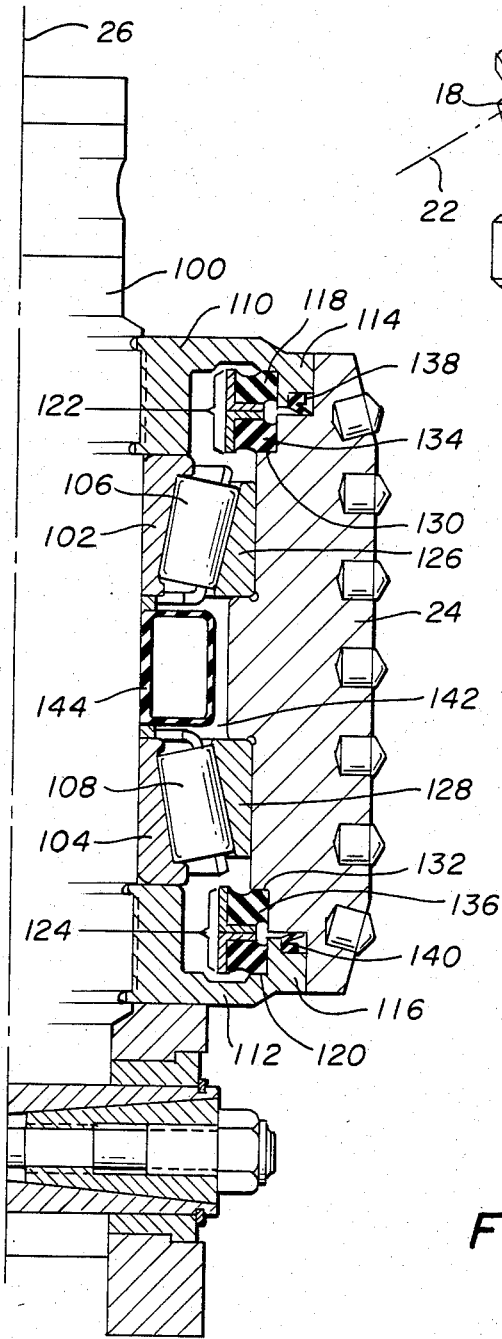
FIG. 3 is a view similar to FIG. 2 of the stabilizer roller of FIG. 1 showing another embodiment of the present invention as illustrated on a vertical axis.

Referring now to FIG. 3, another embodiment of the invention is shown in the environment of an earth-engaging apparatus mounted for rotation about a vertical axis. In this instance the stabilizer roller 24 is shown as mounted for rotation about an axle or pin on vertical axis 26. As in the previous description with respect to the cutter members 20, pin 100 defines an area for seating inner races 102, 104 of upper and lower roller bearing means 106, 108 respectively. Opposed end plates 110 and 112, each having radially extending web members 114 and 116 are disposed adjacent opposite ends of the axle or pin 100. An internal surface on the end plates define a shoulder 118, 120 for receiving and bonding thereto the non-rotating half of the primary sealing means 122, 124.

The internal surface of the stabilizing roller 24 likewise defines a surface providing a seat for the outer races 126, 128 of the roller bearing means 106, 108. Shoulders 130 and 132 are provided for receiving and bonding thereto, in opposed sealed engagement, the rotating half 134, 136 of the primary sealing means. Annular dust exclusion seals 138 and 140 are also supported between the respective end plates and the adjacent end of the stabilizer roller to prevent dust from contacting the metal sealing faces of the primary seals.

Thus, as before, an internal sealed volume 142 is provided within which are positioned the roller bearing means 106, 108 and the metal faced primary seals 122 and 124. This volume is likewise filled with lubricant to maintain the seals and the bearings at all times in a lubricated condition. It is seen that, in this embodiment, the uppermost primary seal 122 has a sealing face which is somewhat below the uppermost limit of the lubricant volume 142. Therefore, although it is not essential that this volume be maintained 100% filled, it is essential that the volume be maintained filled so that the lubricant does not fall below this metal seal as that would mean that the entire periphery or sealing area of the seal would be depleted of oil and in all likelihood rapidly fail.

The embodiment of the invention shown in this environment includes an inflated flexible bladder 144 comprising an annular tube or boot disposed within the cavity 142 in the axial space between the roller bearings 106 and 108. As before, the flexible container is preferably made of a lubricant impervious rubber or synthetic which will, in the inflated condition, compress in accordance with the increased internal pressure within the volume due to thermal expansion of the oil, sufficiently to maintain the pressure therein at a value less than the pressure which causes leaks through the primary seals 122 and 124 so that during use no lubricant is lost from the volume 142 and the seals and bearing means therein are, at all times, flooded or immersed in the lubricant.

Thus, the invention contemplates the use of an internal pressure compensator within a sealed lubricant volume defined between rotating and non-rotating members of an earth boring apparatus. It is apparent that either the closed celled, gas-filled elastomer shown in FIG. 2 or the inflated flexible boot or tube shown in FIG. 3 can be used to accomplish such result as long as the compressibility is at a pressure less than the pressure for breaching the primary seals so that the pressure increase within the system is kept below the internal pressure limits of the seal assembly.

I claim:

1. An improved earth boring apparatus having an earth contacting member rotatably mounted on bearing means disposed on an axle member, and seal means disposed between said earth contacting member and said axle member, said seal means including a pair of primary seals, one each adjacent but outside said bearing means, to define therebetween a sealed lubricant volume enclosing said bearing means, and a lubricant having a level substantially filling said lubricant volume, said primary seals generally effective to prevent loss of said lubricant until the internal pressure exceeds the external pressure on said primary seals by a certain limit, wherein said improvement comprises:

a resilient compressible member disposed entirely within said sealed lubricant volume, said member being generally impervious to said lubricant and compressible in response to increased internal pressure due to thermal expansion of said lubricant, said compression accommodating an increased volume of said lubricant to prevent the internal pressure in said sealed lubricant volume from exceeding the internal pressure limit of said primary seals thereby preventing loss of lubricant from said sealed lubricant volume and maintaining the lubricant level substantially as originally filled.

2. Structure according to claim 1 wherein said compressible member is an annular gas-filled rubber tube.

3. Structure according to claim 1 wherein said compressible member is a closed cell gas-filled elastomer.

4. Structure according to claim 1 wherein at least one of said primary seals is disposed such that at least a portion of it defines the greatest elevation of said sealed lubricant volume so that said volume must remain substantially full for said portion of said seal to be within said lubricant.

* * * * *